United States Patent
Nath et al.

(10) Patent No.: US 11,994,294 B2
(45) Date of Patent: May 28, 2024

(54) COMBUSTOR LINER

(71) Applicant: General Electric Company, Schenectady, NY (US)

(72) Inventors: Hiranya Nath, Bengaluru (IN); Ravindra Shankar Ganiger, Bengaluru (IN); Sripathi Mohan, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/931,700

(22) Filed: Sep. 13, 2022

(65) Prior Publication Data

US 2023/0366549 A1   Nov. 16, 2023

(30) Foreign Application Priority Data

May 13, 2022 (IN) .............................. 202211027643

(51) Int. Cl.
*F23R 3/06* (2006.01)
*F02C 7/04* (2006.01)
*F23R 3/00* (2006.01)

(52) U.S. Cl.
CPC .................. *F23R 3/06* (2013.01); *F02C 7/04* (2013.01); *F23R 3/002* (2013.01); *F23R 2900/03044* (2013.01)

(58) Field of Classification Search
CPC .... F23R 3/002; F23R 3/02; F23R 3/06; F23R 3/44; F23R 3/46; F23R 3/50; F23R 3/60; F23R 2900/00005; F23R 2900/00017; F23R 2900/00019; F23R 2900/03043; F23R 2900/03044
See application file for complete search history.

(56) References Cited

U.S. PATENT DOCUMENTS

| | | | |
|---|---|---|---|
| 3,737,152 A | 6/1973 | Wilson | |
| 3,793,827 A | 2/1974 | Ekstedt | |
| 3,811,276 A | 5/1974 | Caruel et al. | |
| 3,845,620 A | 11/1974 | Kenworthy | |
| 4,004,056 A | 1/1977 | Carroll | |
| 4,380,896 A | 4/1983 | Wiebe | |
| 4,414,816 A * | 11/1983 | Craig | F23R 3/002 60/757 |
| 6,155,056 A | 12/2000 | Sampath et al. | |

(Continued)

FOREIGN PATENT DOCUMENTS

| | | |
|---|---|---|
| EP | 0905353 B1 | 1/2003 |
| EP | 2995863 B1 | 5/2018 |

(Continued)

*Primary Examiner* — Scott J Walthour

(74) *Attorney, Agent, or Firm* — Venable LLP; Michele V. Frank

(57) ABSTRACT

A combustor includes a skeleton mesh structure having a plurality of structural elements configured to mesh together to form the skeleton mesh structure, each of the plurality of structural elements including a frame and, a plurality of louvers connected to the frame. The combustor also includes an inner liner mounted to the skeleton mesh structure to define a combustion chamber. The inner liner includes a plurality of inner planks mounted to the skeleton mesh structure, each of the plurality of inner planks being mounted to a corresponding one of the plurality of structural elements.

18 Claims, 7 Drawing Sheets

(56) References Cited

U.S. PATENT DOCUMENTS

| | | |
|---|---|---|
| 6,427,446 B1 | 8/2002 | Kraft et al. |
| 7,017,334 B2 | 3/2006 | Mayer et al. |
| 7,152,411 B2 | 12/2006 | McCaffrey et al. |
| 7,219,498 B2 | 5/2007 | Hadder |
| 7,237,389 B2 | 7/2007 | Ryan et al. |
| 7,338,244 B2 | 3/2008 | Glessner et al. |
| 7,389,643 B2 | 6/2008 | Simons et al. |
| 8,033,114 B2 | 10/2011 | Hernandez et al. |
| 8,316,541 B2 | 11/2012 | Patel et al. |
| 8,727,714 B2 | 5/2014 | Snider et al. |
| 9,080,770 B2 | 7/2015 | Dudebout et al. |
| 9,127,565 B2 | 9/2015 | Keller et al. |
| 9,328,665 B2 | 5/2016 | Doerr et al. |
| 9,341,377 B2 | 5/2016 | Kramer |
| 9,360,217 B2 | 6/2016 | DiCintio et al. |
| 9,612,017 B2 | 4/2017 | Vetters |
| 9,651,258 B2 | 5/2017 | Graves et al. |
| 9,709,280 B2 | 7/2017 | Preston, III |
| 9,829,199 B2 | 11/2017 | Mayer |
| 9,958,159 B2 | 5/2018 | Smallwood et al. |
| 10,107,128 B2 | 10/2018 | Romanov et al. |
| 10,378,767 B2 | 8/2019 | Maurer et al. |
| 10,386,066 B2 | 8/2019 | Cunha et al. |
| 10,422,532 B2 | 9/2019 | Sadil et al. |
| 10,451,279 B2 | 10/2019 | Staufer |
| 10,473,331 B2 | 11/2019 | Quach et al. |
| 10,563,865 B2 | 2/2020 | Chang |
| 10,598,382 B2 | 3/2020 | Tu et al. |
| 10,648,666 B2 | 5/2020 | Bouldin et al. |
| 10,767,863 B2 | 9/2020 | Freeman et al. |
| 10,801,730 B2 | 10/2020 | Kramer |
| 10,801,731 B2 | 10/2020 | Dillard |
| 10,808,930 B2 | 10/2020 | Schlichting |
| 10,969,103 B2 | 4/2021 | Chang et al. |
| 11,015,812 B2 | 5/2021 | Petty, Sr. et al. |
| 2010/0229564 A1* | 9/2010 | Chila ................ F23R 3/06 60/752 |
| 2010/0236250 A1 | 9/2010 | Headland et al. |
| 2015/0260399 A1 | 9/2015 | Low |
| 2016/0245518 A1 | 8/2016 | Drake |
| 2018/0292090 A1 | 10/2018 | Dyer et al. |
| 2018/0306113 A1 | 10/2018 | Morton et al. |
| 2020/0116360 A1 | 4/2020 | White et al. |
| 2020/0348023 A1 | 11/2020 | Paauwe et al. |
| 2021/0018178 A1 | 1/2021 | Sze |
| 2021/0102705 A1 | 4/2021 | Kramer |
| 2021/0325043 A1 | 10/2021 | Freeman et al. |

FOREIGN PATENT DOCUMENTS

| | | |
|---|---|---|
| EP | 2868973 B1 | 12/2018 |
| EP | 3770500 A1 | 1/2021 |
| EP | 3321586 B1 | 6/2021 |
| GB | 2432902 B | 1/2011 |

* cited by examiner

COMBUSTOR LINER

CROSS REFERENCE TO RELATED APPLICATIONS

The present application claims the benefit of Indian Patent Application No. 202211027643, filed on May 13, 2022, which is hereby incorporated by reference herein in its entirety.

TECHNICAL FIELD

The present disclosure relates generally to combustor liners.

BACKGROUND

A gas turbine engine generally includes a fan and a core arranged in flow communication with one another, with the core disposed downstream of the fan in the direction of flow through the gas turbine engine. The core of the gas turbine engine generally includes, in serial flow order, a compressor section, a combustion section, a turbine section, and an exhaust section. With multi-shaft gas turbine engines, the compressor section can include a high pressure compressor (HPC) disposed downstream of a low pressure compressor (LPC), and the turbine section can similarly include a low pressure turbine (LPT) disposed downstream of a high pressure turbine (HPT). With such a configuration, the HPC is coupled with the HPT via a high pressure shaft (HPS), and the LPC is coupled with the LPT via a low pressure shaft (LPS). In operation, at least a portion of air over the fan is provided to an inlet of the core. Such a portion of the air is progressively compressed by the LPC and then by the HPC until the compressed air reaches the combustion section. Fuel is mixed with the compressed air and burned within the combustion section to produce combustion gases. The combustion gases are routed from the combustion section through the HPT and then through the LPT. The flow of combustion gases through the turbine section drives the HPT and the LPT, each of which in turn drives a respective one of the HPC and the LPC via the HPS and the LPS. The combustion gases are then routed through the exhaust section, e.g., to atmosphere. The LPT drives the LPS, which drives the LPC. In addition to driving the LPC, the LPS can drive the fan through a power gearbox, which allows the fan to be rotated at fewer revolutions per unit of time than the rotational speed of the LPS, for greater efficiency.

The fuel that mixed with the compressed air and burned within the combustion section is delivered through a fuel nozzle.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
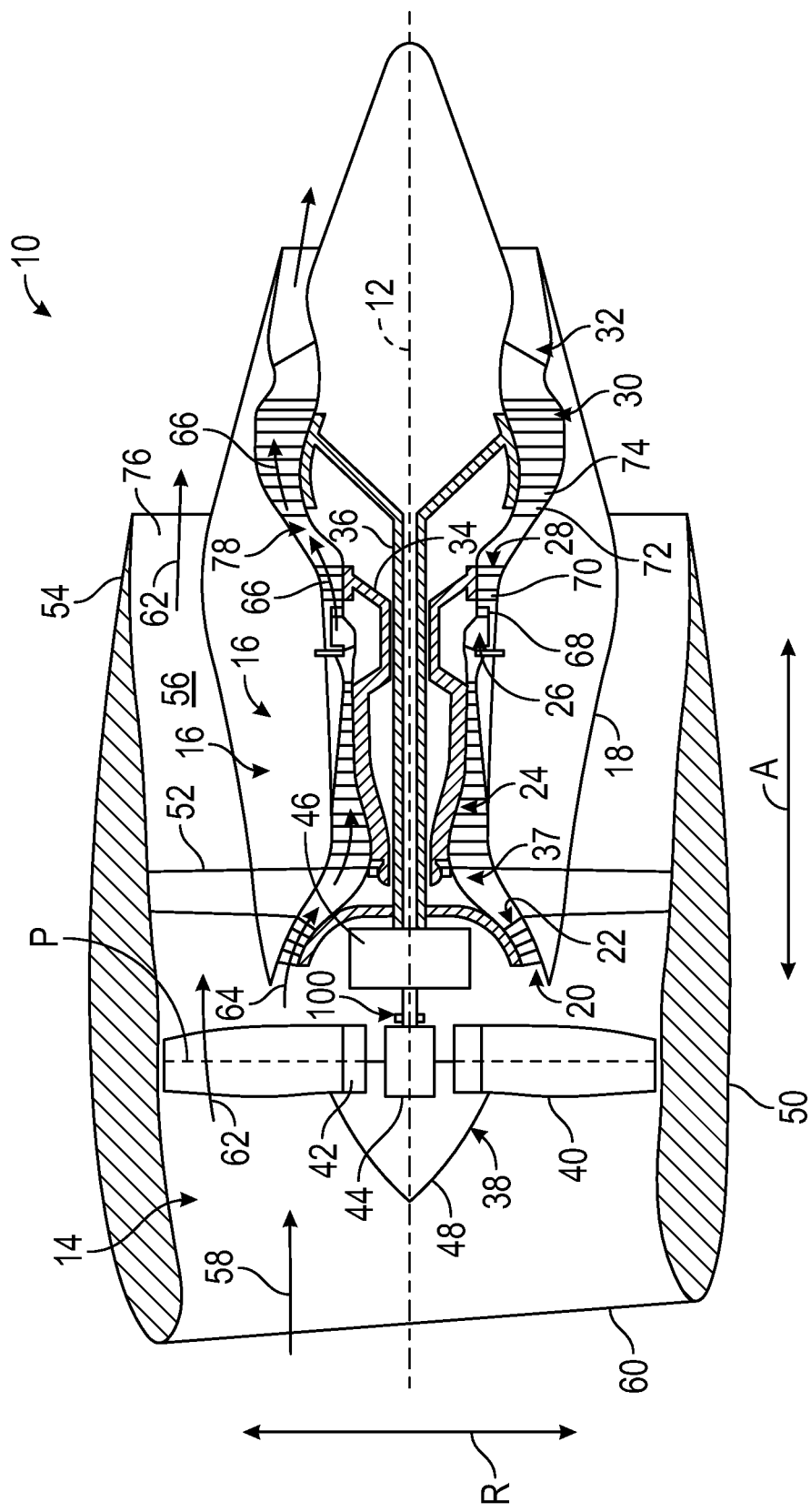
FIG. 1 is a schematic cross-sectional diagram of a turbine engine, according to an embodiment of the present disclosure.

Additional features, advantages, and embodiments of the present disclosure are set forth or apparent from a consideration of the following detailed description, drawings, and claims. Moreover, it is to be understood that both the foregoing summary of the present disclosure and the following detailed description are exemplary, and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

In the following specification and the claims, reference may be made to a number of "optional" or "optionally" elements meaning that the subsequently described event or circumstance may occur or may not occur, and that the description includes instances in which the event occurs and instances in which the event does not occur.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine or the combustor. Moreover, the terms "radial" and "radially" refer to directions and orientations that extend substantially perpendicular to the centerline of the turbine engine or the fuel-air mixer assembly. In addition, as used herein, the terms "circumferential" and "circumferentially" refer to directions and orientations that extend arcuately about the centerline of the turbine engine or the fuel-air mixer assembly.

As will be further described in detail in the following paragraphs, a combustor is provided with improved liner durability under a harsh heat and stress environment. The combustor includes a skeleton mesh structure (also referred to as a hanger or a truss) on which are mounted an inner liner and an outer liner. The skeleton mesh structure acts as a supporting structure for the inner liner and the outer liner as whole. In an embodiment, the skeleton mesh structure can be made of metal. The skeleton mesh structure together with the inner liner and the outer liner define the combustion chamber. The inner liner includes a plurality of inner planks. The plurality inner planks cover at least the inner side of the skeleton mesh structure. In an embodiment, the plurality of inner planks can be made of a ceramic material, a Ceramic Matrix Composite (CMC) material, or a metal coated with CMC or Thermal Barrier Coating (TBC). In an embodiment, the plurality inner planks are exposed to hot flames. The skeleton mesh structure can be shaped to operate as louvers to provide impingement cooling air on the cold side of the inner planks. The skeleton mesh structure can significantly improve durability due to hoop stress elimination or reduction. The plurality of inner planks are mounted to the skeleton mesh structure having the louvers. The louvers guide cooling air impingement on the plurality of inner planks. A set of louvers can be laid out to supply directed cooling air to a single plank in the plurality of inner planks or multiple planks in the plurality of inner planks. The skeleton mesh structure having the louvers together with the plurality of inner planks can improve durability by reducing or substantially eliminating hoop stress while providing a lightweight liner configuration for the combustor. In addition, the use of the plurality of inner planks together with the skeleton mesh structure having the louvers provides a modular or a segmented configuration that facilitates manufacturing and/or inspection, servicing and replacement of individual planks and/or louvers.

FIG. 1 is a schematic cross-sectional diagram of a turbine engine 10, according to an embodiment of the present disclosure. More particularly, for the embodiment shown in FIG. 1, the turbine engine 10 is a high-bypass turbine engine. As shown in FIG. 1, the turbine engine 10 defines an axial direction A (extending parallel to a longitudinal centerline 12 provided for reference) and a radial direction R, generally perpendicular to the axial direction A. The turbine engine 10 includes a fan section 14 and a core turbine engine 16 disposed downstream from the fan section 14. The term "downstream" is used herein in reference to air flow direction 58.

The core turbine engine 16 depicted generally includes an outer casing 18 that is substantially tubular and that defines an annular inlet 20. The outer casing 18 encases, in serial flow relationship, a compressor section including a booster or a low pressure compressor (LPC) 22 and a high pressure compressor (HPC) 24, a combustion section 26, a turbine section including a high pressure turbine (HPT) 28 and a low pressure turbine (LPT) 30, and a jet exhaust nozzle section 32. A high pressure shaft (HPS) 34 drivingly connects the HPT 28 to the HPC 24. A low pressure shaft (LPS) 36 drivingly connects the LPT 30 to the LPC 22. The compressor section, the combustion section 26, the turbine section, and the jet exhaust nozzle section 32 together define a core air flow path 37.

For the embodiment depicted, the fan section 14 includes a fan 38 with a variable pitch having a plurality of fan blades 40 coupled to a disk 42 in a spaced apart manner. As depicted, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, the disk 42, and the actuation member 44 are together rotatable about the longitudinal centerline 12 (longitudinal axis) by the LPS 36 across a power gear box 46. The power gear box 46 includes a plurality of gears for adjusting or controlling the rotational speed of the fan 38 relative to the LPS 36 to a more efficient rotational fan speed.

The disk 42 is covered by a rotatable front hub 48 aerodynamically contoured to promote an air flow through the plurality of fan blades 40. Additionally, the fan section 14 includes an annular fan casing or a nacelle 50 that circumferentially surrounds the fan 38 and/or at least a portion of the core turbine engine 16. The nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass air flow passage 56 therebetween.

During operation of the turbine engine 10, a volume of air flow 58 enters the turbine engine 10 in air flow direction 58 through an associated inlet 60 of the nacelle 50 and/or the fan section 14. As the volume of air passes across the fan blades 40, a first portion of the air, as indicated by arrows 62, is directed or routed into the bypass air flow passage 56 and a second portion of the air as indicated by arrow 64 is directed or routed into the core air flow path 37, or, more specifically, into the LPC 22. The ratio between the first portion of air indicated by arrows 62 and the second portion of air indicated by arrows 64 is commonly known as a bypass ratio. The pressure of the second portion of air indicated by arrows 64 is then increased as it is routed through the HPC 24 and into the combustion section 26, where it is mixed with fuel and burned to provide combustion gases 66.

The combustion gases 66 are routed through the HPT 28 where a portion of thermal energy and/or kinetic energy from the combustion gases 66 is extracted via sequential stages of HPT stator vanes 68 that are coupled to the outer casing 18 and HPT rotor blades 70 that are coupled to the HPS 34, thus, causing the HPS 34 to rotate, thereby supporting operation of the HPC 24. The combustion gases 66 are then routed through the LPT 30 where a second portion of thermal and kinetic energy is extracted from the combustion gases 66 via sequential stages of LPT stator vanes 72 that are coupled to the outer casing 18 and LPT rotor blades 74 that are coupled to the LPS 36, thus, causing the LPS 36 to rotate, thereby supporting operation of the LPC 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass air flow passage 56 before it is exhausted from a fan nozzle exhaust section 76 of the turbine engine 10, also providing propulsive thrust. The HPT 28, the LPT 30, and the jet exhaust nozzle section 32 at least partially define a hot gas path 78 for routing the combustion gases 66 through the core turbine engine 16.

The turbine engine 10 depicted in FIG. 1 is, however, by way of example only, and that, in other exemplary embodiments, the turbine engine 10 may have any other suitable configuration. In still other exemplary embodiments, aspects of the present disclosure may be incorporated into any other suitable gas turbine engine. For example, in other exemplary embodiments, aspects of the present disclosure may be incorporated into, e.g., a turboshaft engine, a turboprop engine, a turbo-core engine, a turbojet engine, etc.

Figure 2:
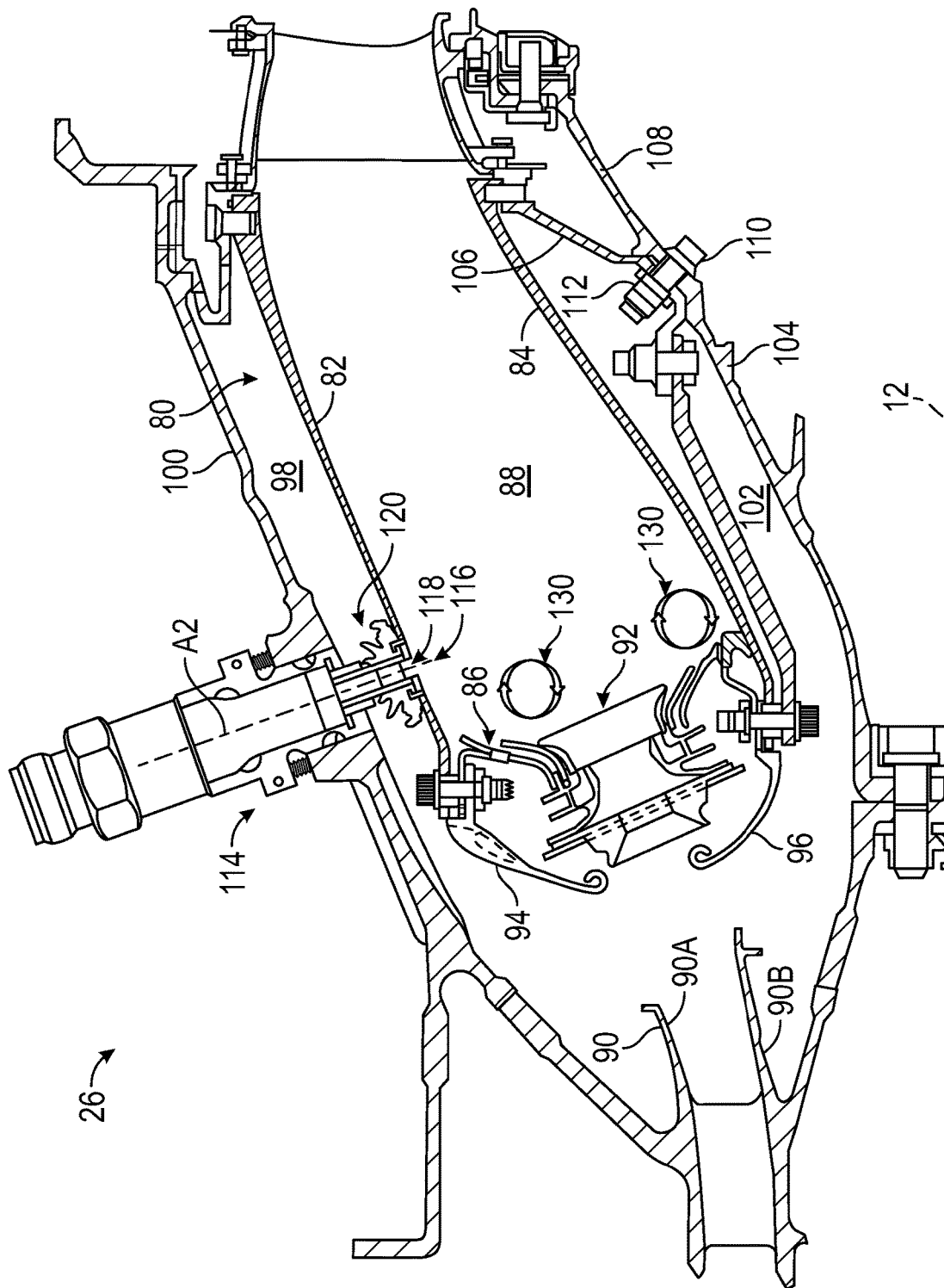
FIG. 2 is a schematic cross-sectional view of the combustion section of the turbine engine of FIG. 1, according to an embodiment of the present disclosure.

FIG. 2 is a schematic, cross-sectional view of the combustion section 26 of the turbine engine 10 of FIG. 1, according to an embodiment of the present disclosure. The combustion section 26 generally includes a combustor 80 that generates the combustion gases discharged into the turbine section, or, more particularly, into the HPT 28. The combustor 80 includes an outer liner 82, an inner liner 84, and a dome 86. The outer liner 82, the inner liner 84, and the dome 86 together define a combustion chamber 88. In addition, a diffuser 90 is positioned upstream of the combustion chamber 88. The diffuser 90 has an outer diffuser wall 90A and an inner diffuser wall 90B. The inner diffuser wall 90B is closer to a longitudinal centerline 12. The diffuser 90 receives an air flow from the compressor section and provides a flow of compressed air to the combustor 80. In an embodiment, the diffuser 90 provides the flow of compressed air to a single circumferential row of fuel/air mixers 92. In an embodiment, the dome 86 of the combustor 80 is configured as a single annular dome, and the circumferential row of fuel/air mixers 92 are provided within openings formed in the dome 86 (air feeding dome or combustor dome). However, in other embodiments, a multiple annular dome can also be used.

In an embodiment, the diffuser 90 can be used to slow the high speed, highly compressed air from a compressor (not shown) to a velocity optimal for the combustor. Furthermore, the diffuser 90 can also be configured to limit the flow distortion as much as possible by avoiding flow effects like boundary layer separation. Like most other gas turbine engine components, the diffuser 90 is generally designed to be as light as possible to reduce weight of the overall engine.

A fuel nozzle (not shown) provides fuel to fuel/air mixers 92 depending upon a desired performance of the combustor 80 at various engine operating states. In the embodiment shown in FIG. 2, an outer cowl 94 (e.g., annular cowl) and an inner cowl 96 (e.g., annular cowl) are located upstream of the combustion chamber 88 so as to direct air flow into fuel/air mixers 92. The outer cowl 94 and the inner cowl 96 may also direct a portion of the flow of air from the diffuser 90 to an outer passage 98 defined between the outer liner 82 and an outer casing 100, and an inner passage 102 defined between the inner liner 84 and an inner casing 104. In addition, an inner support cone 106 is further shown as being connected to a nozzle support 108 using a plurality of bolts 110 and nuts 112. Other combustion sections may, of course, include any other suitable structural configuration.

The combustor 80 is also provided with an igniter 114. The igniter 114 is provided to ignite the fuel/air mixture supplied to combustion chamber 88 of the combustor 80. The igniter 114 is attached to the outer casing 100 of the combustor 80 in a substantially fixed manner. Additionally, the igniter 114 extends generally along an axial direction A2, defining a distal end 116 that is positioned proximate to an opening in a combustor member of the combustion chamber 88. The distal end 116 is positioned proximate to an opening 118 within the outer liner 82 of the combustor 80 to the combustion chamber 88.

In an embodiment, the dome 86 of the combustor 80 together with the outer liner 82, the inner liner 84 and fuel/air mixers 92 forms the combustion chamber define a swirling flow 130. The air flows through the fuel/air mixer assembly 92 as the air enters the combustion chamber 88. The role of the dome 86 and fuel/air mixer assembly 92 is to generate turbulence in the air flow to rapidly mix the air with the fuel. The swirler (also called mixer) establishes a local low pressure zone that forces some of the combustion products to recirculate, as illustrated in FIG. 2, creating needed high turbulence.

Figure 3:
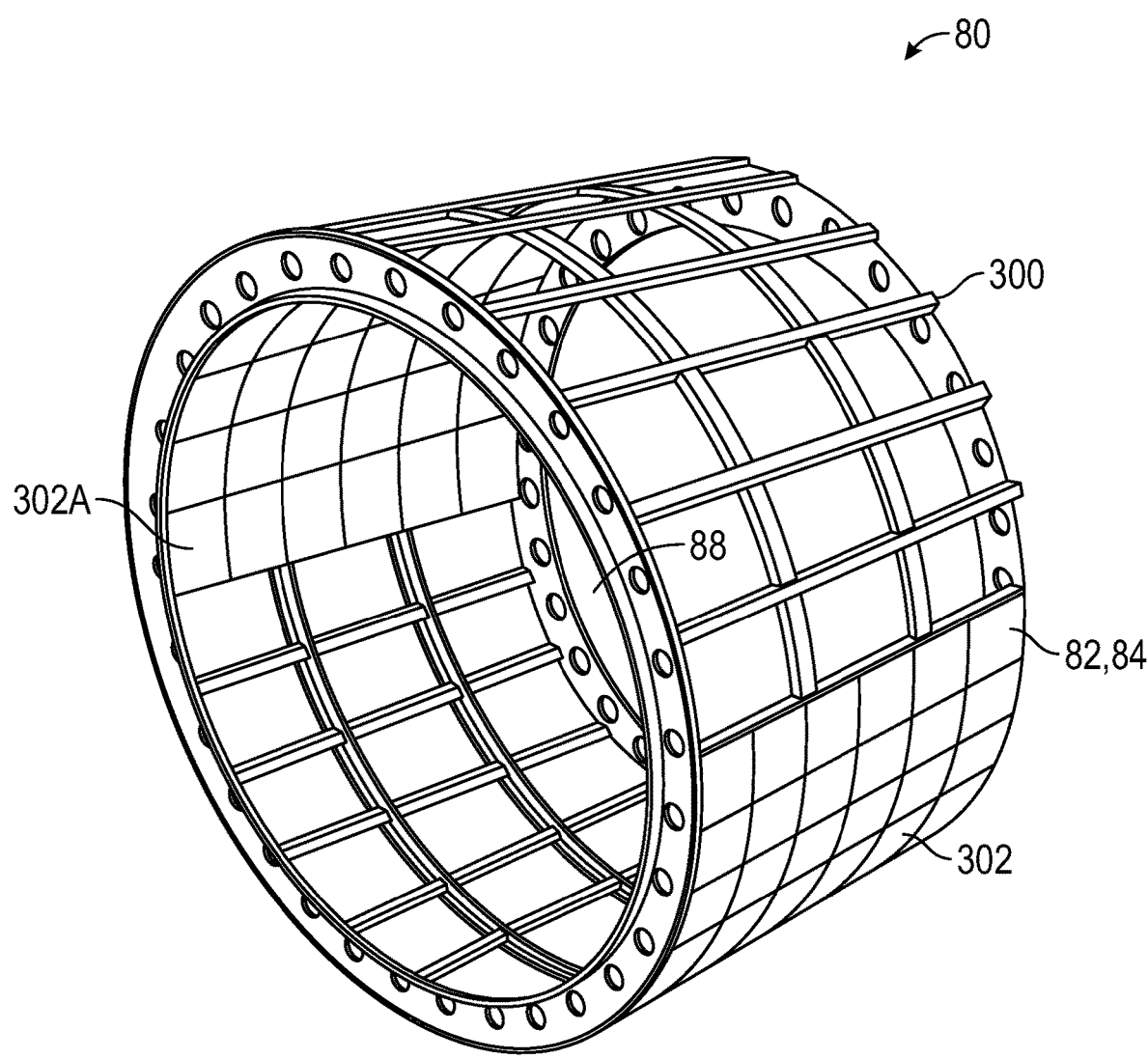
FIG. 3 is a schematic perspective view of a section of the combustor, according to an embodiment of the present disclosure.

FIG. 3 is a schematic perspective view of a section of the combustor 80, according to an embodiment of the present disclosure. The combustor 80 is shown having a cylindrical configuration. The combustor 80 comprises a skeleton mesh structure 300 (also referred to as a hanger or a truss) on which are mounted the inner liner 84 and the outer liner 82. The skeleton mesh structure 300 acts as a supporting structure for the inner liner 84 and the outer liner 82 as whole. In an embodiment, the skeleton mesh structure 300 is made of metal. The skeleton mesh structure 300 together with the inner liner 84 and the outer liner 82 define the combustion chamber 88. The inner liner 84 and the outer liner 82 include a plurality of planks 302. The plurality of planks 302 include a plurality of inner planks 302A. The plurality of inner planks 302A are mounted and cover the inner side of the skeleton mesh structure 300. The plurality of inner planks 302A are exposed to hot flames within the combustion chamber 88. In an embodiment, the plurality of inner planks 302A are made of ceramic or are made of metal coated with a ceramic coating to enhance resistance to relatively high temperatures. In an embodiment, the plurality of inner planks 302A can be made of a ceramic material, a Ceramic Matrix Composite (CMC) material, or a metal coated with CMC.

The skeleton mesh structure 300 together with the plurality of inner planks 302A can improve durability due to hoop stress reduction or elimination while providing a lightweight liner configuration for the combustor 80. For example, the present configuration provides at least twenty percent weight reduction compared to conventional combustors. As a result, the overall life cycle of the combustor 80 is improved to greater than twenty thousand cycles. Furthermore, the present configuration provides the additional benefit of being modular or segmented and, thus, relatively easy to repair. Indeed, if one or more planks in the plurality of inner planks 302A is damaged, only the damaged one or more planks is replaced and not the entire inner liner 84. Furthermore, the present configuration lends itself to be relatively easy to inspect and to repair. All these benefits result in overall cost savings.

Figure 4:
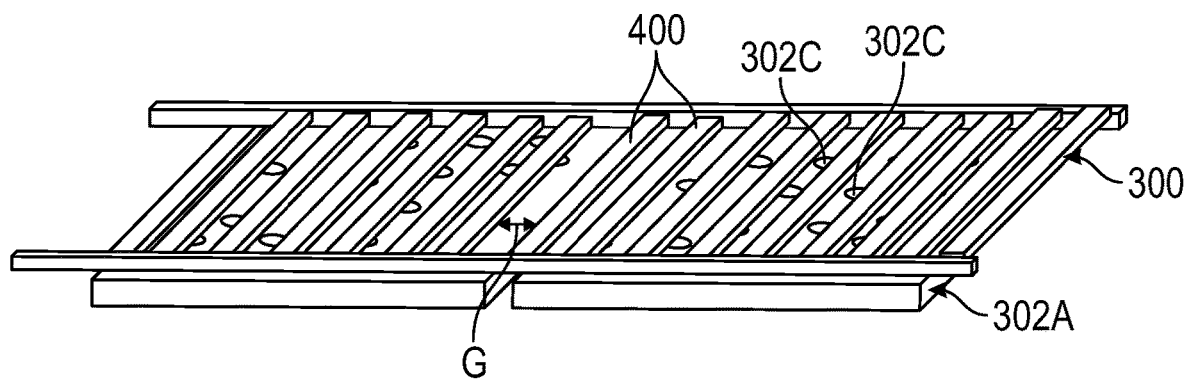
FIG. 4 is a schematic perspective view of a section of the inner liner and the outer liner of the combustor, according to an embodiment of the present disclosure.

FIG. 4 is a schematic perspective view of a section of the inner liner 84 and the outer liner 82 of the combustor 80, according to an embodiment of the present disclosure. As shown in FIG. 4, the plurality of planks 302, which include the plurality of inner planks 302A, are mounted to the skeleton mesh structure 300. The plurality of inner planks 302A include a plurality of holes 302C. As shown in FIG. 4, the plurality of inner planks 302A are mounted on the skeleton mesh structure 300. The plurality of holes 302C are distributed along a surface of the plurality of inner planks 302A. The skeleton mesh structure 300 comprises a plurality of louvers 400 that are configured to allow air to pass through gaps G between the louvers to impinge on the plurality of inner planks 302A. The air impinging on the plurality of inner planks 302A can further enter through the plurality of holes 302C in the plurality of inner planks 302A to further cool down the plurality of inner planks 302A.

Figure 5:
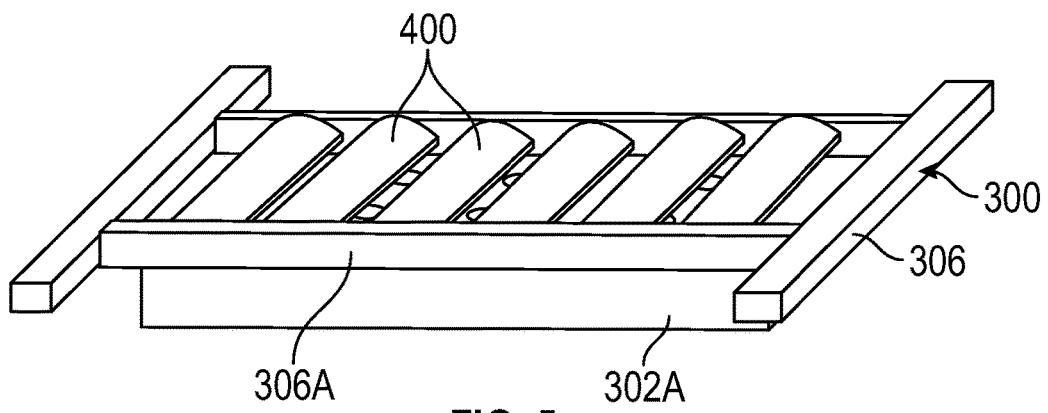
FIG. 5 is a schematic perspective view of one of the plurality of inner planks mounted to a structural element of a skeleton mesh structure, according to an embodiment of the present invention.

FIG. 5 is a schematic perspective view of one of the plurality of inner planks 302A mounted to a structural element 306 of the skeleton mesh structure 300, according to an embodiment of the present invention. As shown in FIG. 5, the skeleton mesh structure 300 can include a plurality of structural elements 306 that mesh together to form the skeleton mesh structure 300 shown in FIGS. 3 and 4. Each of the plurality of inner planks 302A is mounted to a corresponding one of the plurality of structural elements 306 of the skeleton mesh structure 300. As shown in FIG. 5, each of the plurality of structural elements 306 of the skeleton mesh structure 300 has a frame 306A and the plurality of louvers 400 connected to the frame 306A of each of the plurality of structural elements 306 of the skeleton mesh structure 300. The plurality of louvers 400 are spaced apart by the gap G to define a plurality of openings to allow air to pass therethrough. In an embodiment, the plurality of louvers 400 can be integrated with the frame 306A. However, the plurality of louvers 400 can also be coupled to the frame 306A using fasteners or soldered to the frame 306A. In an embodiment, the skeleton mesh structure 300 having the louvers 400 together with the plurality of inner planks 302A can improve durability by substantially reducing or eliminating hoop stress while providing a lightweight liner configuration for the combustor 80. In addition, the use of the plurality of inner planks 302A together with the skeleton mesh structure 300 provides a modular or a segmented configuration that facilitates manufacturing and/or inspection, servicing, and replacement of individual inner planks 302A.

Figure 6A:
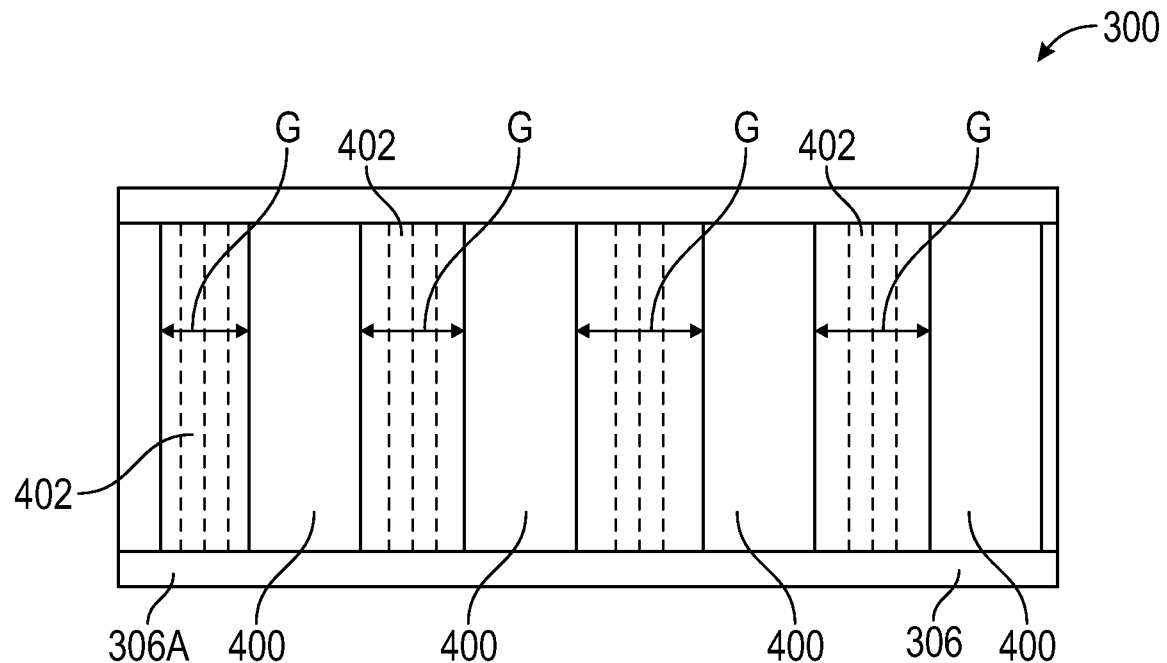
FIG. 6A is a schematic face view of one of the plurality of structural elements having a plurality of louvers, according to an embodiment of the present disclosure.

FIG. 6A is a schematic view of one of the plurality of structural elements 306 having the plurality of louvers 400, according to an embodiment of the present disclosure. As shown in FIG. 6A, each of the plurality of structural elements 306 of the skeleton mesh structure 300 has the frame 306A and the plurality of louvers 400 are connected or coupled to the frame 306A of each of the plurality of structural elements 306 of the skeleton mesh structure 300. The plurality of louvers 400 are spaced apart by the gap G to define a plurality of openings 402 to allow air to pass therethrough.

Figure 6B:
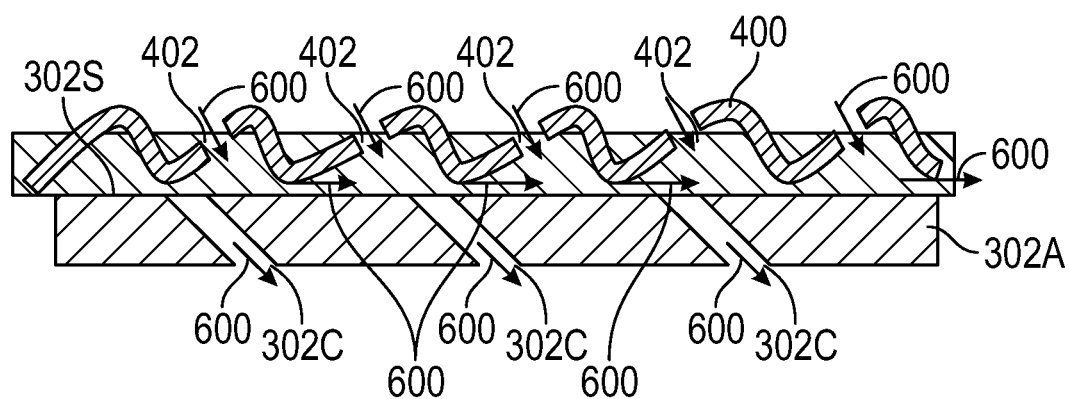
FIG. 6B is a schematic cross-sectional view of one of the plurality of structural elements having the plurality of louvers and one of the plurality of inner planks, according to an embodiment of the present disclosure.

FIG. 6B is a schematic cross-sectional view of one of the plurality of structural elements 306 having the plurality of louvers 400 and one of the plurality of inner planks 302A, according to an embodiment of the present disclosure. In FIG. 6B, the plurality louvers are shown schematically as a wiggly line. The wiggly line representing the plurality of louvers 400 has the plurality of openings 402 defined by the gap G between the respective plurality of louvers 400. Each of the plurality of inner planks 302A includes the plurality of holes 302C. In one embodiment, the plurality of holes 302C are oblique with respect to the surface 302S of each of the plurality of inner planks 302A. Airflow represented by arrow 600 enters through the plurality of openings 402, and a portion of airflow exiting the plurality of openings propagates along the surface 302S of each of the plurality of inner planks 302A and another portion of airflow exiting the plurality of openings 402 enters through the plurality of holes 302C. The angle and size of the plurality of holes 302C in the plurality of inner planks 302A relative the surface 302S of each of the plurality of inner planks 302A can be selected to control an amount of airflow that would enter the plurality of holes 302C relative to an amount of airflow that would propagate along the surface 302S of each of the plurality of inner planks 302A.

Figure 7A:
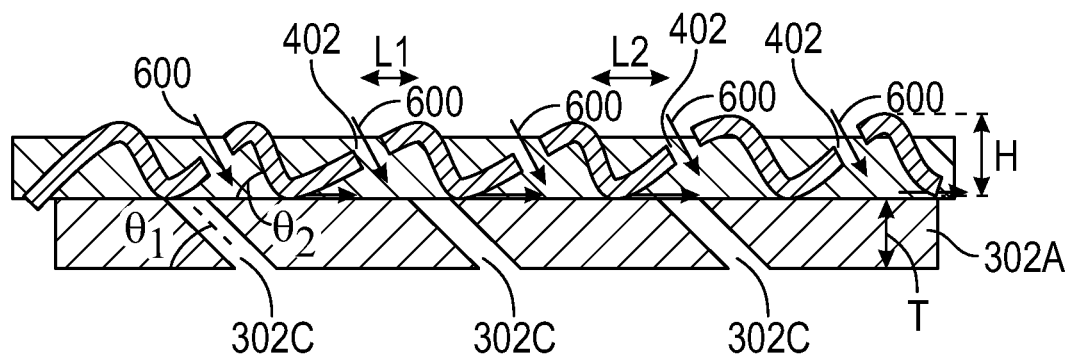
FIGS. 7A and 7B are schematic cross-sectional views of one of the plurality of structural elements having the plurality of louvers and one of the plurality of inner planks, according to an embodiment of the present disclosure.
Figure 7B:
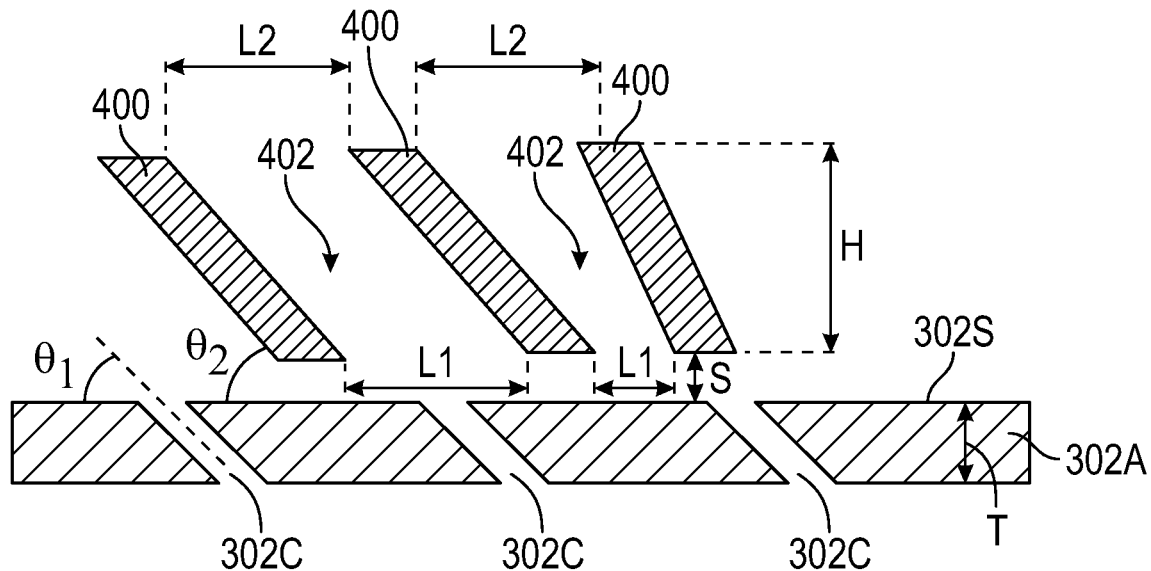

FIGS. 7A and 7B are schematic cross-sectional views of one of the plurality of structural elements 306 having the plurality of louvers 400 and one of the plurality of inner planks 302A, according to an embodiment of the present disclosure. FIGS. 7A and 7B further show a few parameters that have an effect on the cooling effectiveness of the airflow represented as arrow 600 (shown in FIG. 7A). As shown in FIG. 7B, the distance L1 is the distance between the bottoms of two consecutive louvers in the plurality of louvers 400. The distance L2 is the distance between the tops of two consecutive louvers of the plurality of louvers 400. The height H is the apparent height of the plurality of louvers 400. The angle $\theta_1$ is the angle of the holes 302C relative to the surface 302S of the plurality of inner planks 302A. The angle $\theta_2$ is the angle of the louvers 400 relative the surface 302S of the plurality of inner planks 302A. The parameter S defines the spacing between the plurality of louvers 400 and the surface 302S of the plurality of inner planks 302A, and the parameter T defines the thickness of the plurality of inner planks 302A.

Figure 7C:
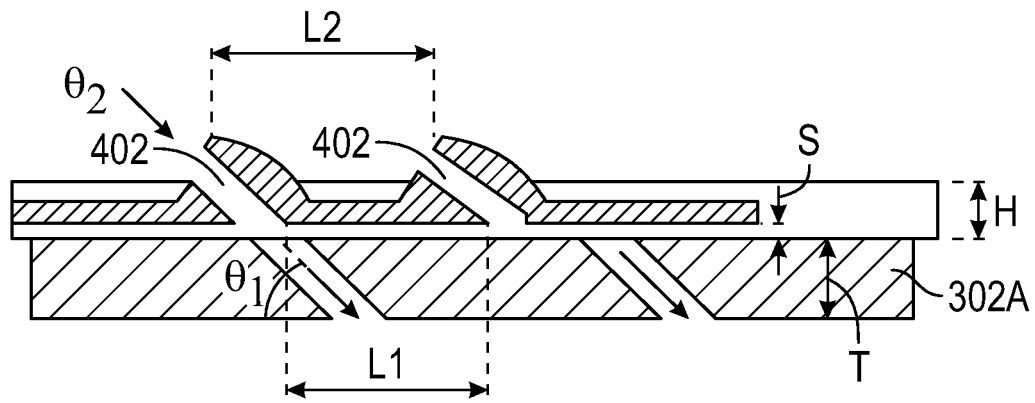
FIG. 7C is a schematic cross-sectional view of one of the plurality of structural elements having the plurality of louvers and one of the plurality of inner planks, according to another embodiment of the present disclosure.

FIG. 7C is a schematic cross-sectional view of one of the plurality of structural elements 306 having the plurality of louvers 400 and one of the plurality of inner planks 302A, according to another embodiment of the present disclosure. FIG. 7C shows another configuration of the plurality of louvers 400. As shown in FIG. 7C, the louvers are formed as one unit with angled openings 402 provided therein.

Table 1 shows the various parameters defined above and how they affect the cooling effectiveness of air flow on the plurality of inner planks 302A. For example, a ratio between L1 and L2 that is between 0.1 and 1.1 provides the maximum cooling effectiveness. Lower values in the range 0.1 to 1.1, however, perform better. For example, the cooling effectiveness is higher when L1 (distance between bottoms of two successive louvers in the plurality of louvers 400) is less than L2 (distance between tops of two successive louvers in the plurality of louvers 400). Similarly, the ratio between $\theta_1$ and $\theta_2$ between 1 and 4.5 provides the maximum cooling effectiveness. Higher values in the range 1 to 4.5, however, perform better. For example, the cooling effectiveness is higher when $\theta_2$ (the angle of the louvers 400 relative the surface 302S) is greater than $\theta_1$ (the angle of the holes 302C relative to the surface 302S). In addition, a ratio between S and T that is between 0.1 and 2 provides the maximum cooling effectiveness. DP/P is the air pressure drop across the liner in percentage.

TABLE 1

| | min | max | Comment |
| --- | --- | --- | --- |
| L1/L2 | 0.1 | 1.1 | lower value is better |
| $\theta_1/\theta_2$ | 1 | 4.5 | higher value is better |
| S/T | 0.1 | 2 | lower value is better |
| H/T | 1 | 4 | higher value is better |
| DP/P, % | 1 | 4 | higher value is better |
| Cooling effectiveness parameter | 1 | 3 | Higher is better |

The cooling effectiveness (CE) parameter can be expressed by the following equation (1). A cooling effectiveness parameter between one and three is optimum. Higher values of the cooling effectiveness parameter perform better, however, and provide a better cooling effectiveness.

Cooling effectiveness param=$(L1/L2)/(\theta_1/\theta_2) \times (S/T)/(DP/P)/(H/T)$ (1)

Figure 8A:
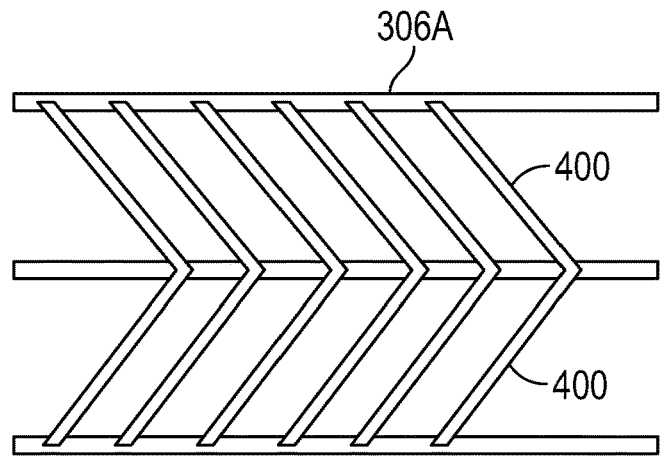
FIGS. 8A, 8B, and 8C show various geometrical configurations and orientations of the louvers relative to the frame of the structural elements of the skeleton mesh structure, according to an embodiment of the present disclosure.
Figure 8B:
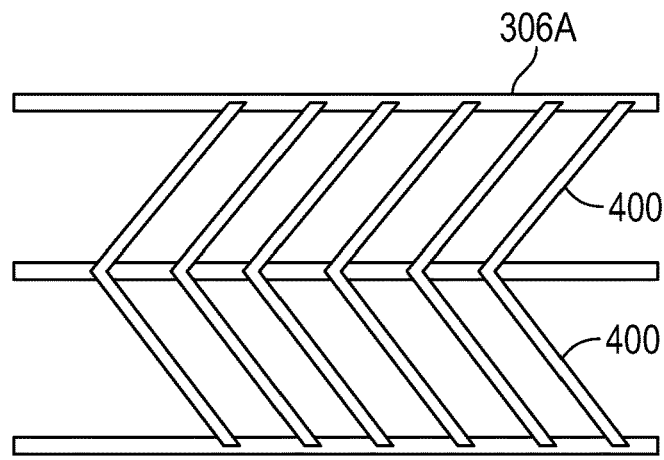
Figure 8C:
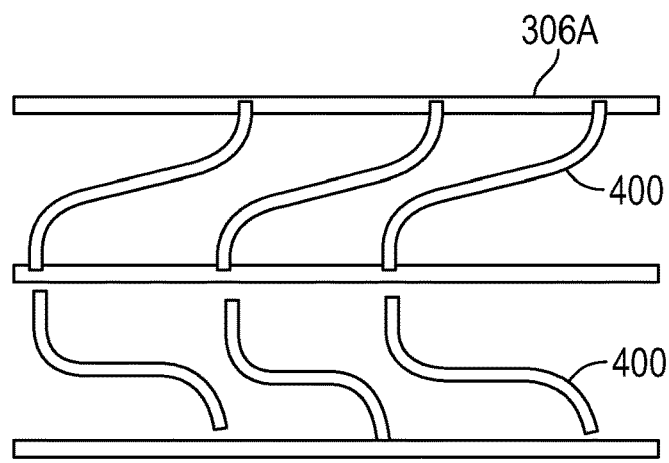

FIGS. 8A, 8B and 8C show various geometrical configurations and orientations of the louvers 400 relative to the frame 306A of the structural element 306 of the skeleton mesh structure 300, according to an embodiment of the present disclosure. FIG. 8A shows an orientation of two adjacent louvers in the plurality of louvers 400 forming a "V" shape in a first direction, according to an embodiment of the present disclosure. FIG. 8B shows an orientation of two adjacent louvers in the plurality of louvers 400 forming a "V" shape in a second direction opposite to the first direction, according to another embodiment of the present disclosure. FIG. 8C shows a wavy shape of two adjacent louvers in the plurality of louvers 400, according to yet another embodiment of the present disclosure. The adjacent plurality of louvers can also be oriented in an opposite direction to the direction shown in FIG. 8C.

As can be appreciated from the discussion above, a combustor includes a skeleton mesh structure having a plurality of structural elements configured to mesh together to form the skeleton mesh structure, each of the plurality of structural elements including a frame and plurality of louvers connected to the frame. The combustor also includes an inner liner mounted to the skeleton mesh structure to define a combustion chamber, the inner liner having a plurality of inner planks mounted to the skeleton mesh structure, each of the plurality of inner planks being mounted to a corresponding one of the plurality of structural elements.

The combustor according to the above clause, the plurality of louvers being spaced apart by a gap to define a plurality of openings to allow air to pass therethrough.

The combustor according to any of the above clauses, the plurality of louvers being integral with the frame of each of the plurality of structural elements of the skeleton mesh structure.

The combustor according to any of the above clauses, each of the plurality of inner planks having a plurality of holes.

The combustor according to any of the above clauses, the plurality of holes being oblique relative to a surface of each of the plurality of inner planks.

The combustor according to any of the above clauses, the plurality of louvers being spaced apart by a gap to define a plurality of openings to allow air to pass therethrough and each of the plurality of inner planks including a plurality of holes that are oriented, such that a portion of airflow exiting through the plurality of openings enters through the plurality of holes, and another portion of airflow exiting the plurality of openings propagates along a surface of each of the plurality of the inner planks.

The combustor according to any of the above clauses, an angle of the plurality of holes relative the surface being selected to control an amount of airflow that enters the plurality of holes relative to another amount of airflow that propagates along the surface.

The combustor according to any of the above clauses, a cooling effectiveness of airflow on the plurality of inner planks being higher when a distance L1 between bottoms of two successive louvers in the plurality of louvers is less than a distance L2 between tops of two successive louvers in the plurality of louvers, such that a ratio between L1 and L2 between 0.1 and 1.1 provides a maximum cooling effectiveness.

The combustor according to any of the above clauses, a cooling effectiveness of airflow on the plurality of inner planks being higher when an angle $\theta_1$ of the holes in each of the plurality of inner planks relative to the surface of each of the plurality of inner planks is greater than an angle $\theta_2$ of the louvers relative the surface such that a ratio between $\theta 1$ and $\theta 2$ between 1 and 4.5 provides a maximum cooling effectiveness.

The combustor according to any of the above clauses, a cooling effectiveness of airflow on the plurality of inner planks being higher when a spacing S between the plurality of louvers and the surface is smaller than a thickness T of the plurality of inner planks such that a ratio between S and T between 0.1 and 2 provides a maximum cooling effectiveness.

Another aspect of the present disclosure is to provide a turbine engine including a combustor. The combustor including a skeleton mesh structure having a plurality of structural elements configured to mesh together to form the skeleton mesh structure, each of the plurality of structural elements including a frame and plurality of louvers connected to the frame. The combustor further including an inner liner mounted to the skeleton mesh structure to define a combustion chamber, the inner liner having a plurality of inner planks mounted to the skeleton mesh structure, each of the plurality of inner planks being mounted to a corresponding one of the plurality of structural elements.

The turbine engine according to the above clause, the plurality of louvers being spaced apart by a gap to define a plurality of openings to allow air to pass therethrough.

The turbine engine according to any of the above clauses, the plurality of louvers being integral with the frame of each of the plurality of structural elements of the skeleton mesh structure.

The turbine engine according to any of the above clauses, each of the plurality of inner planks having a plurality of holes.

The turbine engine according to any of the above clauses, the plurality of holes being oblique relative to a surface of each of the plurality of inner planks.

The turbine engine according to any of the above clauses, the plurality of louvers being spaced apart by a gap to define a plurality of openings to allow air to pass therethrough and each of the plurality of inner planks including a plurality of holes that are oriented, such that a portion of airflow exiting through the plurality of openings enters through the plurality of holes, and another portion of airflow exiting the plurality of openings propagates along a surface of each of the plurality of the inner planks.

The turbine engine according to any of the above clauses, an angle of the plurality of holes relative the surface being selected to control an amount of airflow that enters the plurality of holes relative to another amount of airflow that propagates along the surface.

The turbine engine according to any of the above clauses, a cooling effectiveness of airflow on the plurality of inner planks being higher when a distance L1 between bottoms of two successive louvers in the plurality of louvers is less than a distance L2 between tops of two successive louvers in the plurality of louvers, such that a ratio between L1 and L2 between 0.1 and 1.1 provides a maximum cooling effectiveness.

The turbine engine according to any of the above clauses, a cooling effectiveness of airflow on the plurality of inner planks being higher when an angle $\theta_1$ of the holes in each of the plurality of inner planks relative to the surface of each of the plurality of inner planks is greater than an angle $\theta_2$ of the louvers relative the surface such that a ratio between $\theta_1$ and $\theta_2$ between 1 and 4.5 provides a maximum cooling effectiveness.

The turbine engine according to any of the above clauses, a cooling effectiveness of airflow on the plurality of inner planks being higher when a spacing S between the plurality of louvers and the surface is less than a thickness T of the plurality of inner planks, such that a ratio between S and T between 0.1 and 2 provides a maximum cooling effectiveness.

Although the foregoing description is directed to the preferred embodiments of the present disclosure, other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. A combustor comprising:
a skeleton mesh structure comprising a plurality of structural elements configured to mesh together to form the skeleton mesh structure, each of the plurality of structural elements comprising a frame and a plurality of louvers connected to the frame; and
an inner liner mounted to the skeleton mesh structure to define a combustion chamber, the inner liner comprising a plurality of inner planks mounted to the skeleton mesh structure, each of the plurality of inner planks being mounted to the frame of a corresponding one of the plurality of structural elements, the plurality of inner planks being exposable to hot flames within the combustion chamber, each of the plurality of inner planks comprises a plurality of holes,
wherein two successive louvers in the plurality of louvers are configured such that a first distance L1 between bottoms of the two successive louvers in the plurality of louvers is less than or equal to a second distance L2 between tops of the two successive louvers in the plurality of louvers such that the two successive louvers are spaced apart by a gap to define an opening to allow airflow to pass therethrough, and the plurality of holes of each of the plurality of inner planks are oriented such that a first portion of airflow exiting through the opening enters through at least one of the plurality of holes, and a second portion of airflow exiting through the opening propagates along a surface of each of the plurality of inner planks in a space between the bottoms of the two successive louvers and the surface of each of the plurality of inner planks.

2. The combustor according to claim 1, wherein the plurality of louvers are spaced apart by a gap to define a plurality of openings to allow air to pass therethrough.

3. The combustor according to claim 2, wherein the plurality of louvers are integral with the frame of each of the plurality of structural elements of the skeleton mesh structure.

4. The combustor according to claim 1, wherein the plurality of holes are oblique relative to the surface of each of the plurality of inner planks.

5. The combustor according to claim 1, wherein respective adjacent pairs of louvers of the plurality of louvers are spaced apart by the gap to define a plurality of openings to allow air to pass therethrough, and wherein a portion of airflow exiting through the plurality of openings enters through the plurality of holes, and another portion of airflow exiting the plurality of openings propagates along the surface of each of the plurality of inner planks.

6. The combustor according to claim 5, wherein an angle and size of the plurality of holes relative to the surface is selected to control an amount of airflow that enters the plurality of holes relative to another amount of airflow that propagates along the surface.

7. The combustor according to claim 5, wherein the two successive louvers in the plurality of louvers are configured such that the first distance L1 between the bottoms of the two successive louvers in the plurality of louvers and the second distance L2 between the tops of the two successive louvers in the plurality of louvers are such that a ratio between L1 and L2 between 0.1 and 1.0 provides a maximum cooling effectiveness of airflow on the plurality of inner planks.

8. The combustor according to claim 5, wherein the plurality of louvers are configured such that an angle $\theta 2$ of the plurality of louvers relative to the surface of each of the plurality of inner planks is less than or equal to an angle $\theta 1$ of the holes in each of the plurality of inner planks relative to the surface, such that a ratio between $\theta 1$ and $\theta 2$ between 1 and 4.5 provides a maximum cooling effectiveness of airflow on the plurality of inner planks.

9. The combustor according to claim 5, wherein the plurality of louvers are configured such that a spacing S between the bottoms of the two successive louvers and the surface of each of the plurality of inner planks, and a thickness T of the plurality of inner planks are such that a ratio between S and T between 0.1 and 2 provides a maximum cooling effectiveness of airflow on the plurality of inner planks.

10. A turbine engine comprising:
a combustor comprising:
(a) a skeleton mesh structure comprising a plurality of structural elements configured to mesh together to form the skeleton mesh structure, each of the plurality of structural elements comprising a frame and a plurality of louvers connected to the frame; and
(b) an inner liner mounted to the skeleton mesh structure to define a combustion chamber, the inner liner comprising a plurality of inner planks mounted to the skeleton mesh structure, each of the plurality of inner planks being mounted to the frame of a corresponding one of the plurality of structural elements, the plurality of inner planks being exposable to hot flames within the combustion chamber,
wherein two successive louvers in the plurality of louvers are configured such that a first distance L1 between bottoms of the two successive louvers in the plurality of louvers is less than or equal to a second distance L2 between tops of the two successive louvers in the plurality of louvers such that the two successive louvers are spaced apart by a gap to define an opening to allow airflow to pass therethrough, and a plurality of holes are defined through each of the plurality of inner planks and are oriented such that a first portion of airflow exiting through the opening enters through at least one of the plurality of holes, and a second portion of airflow exiting through the opening propagates along a surface of each of the plurality of inner planks in a space between the bottoms of the two successive louvers and the surface of each of the plurality of inner planks.

11. The turbine engine according to claim 10, wherein respective adjacent pairs of louvers of the plurality of louvers are spaced apart by the gap to define a plurality of openings to allow air to pass therethrough.

12. The turbine engine according to claim 11, wherein the plurality of louvers are integral with the frame of each of the plurality of structural elements of the skeleton mesh structure.

13. The turbine engine according to claim 10, wherein the plurality of holes are oblique relative to the surface of each of the plurality of inner planks.

14. The turbine engine according to claim 11, wherein respective adjacent pairs of the plurality of louvers are spaced apart by the gap to define a plurality of openings to allow air to pass therethrough, and wherein a portion of airflow exiting through the plurality of openings enters through the plurality of holes, and another portion of airflow exiting the plurality of openings propagates along the surface of each of the plurality of the inner planks.

15. The turbine engine according to claim 14, wherein an angle of the plurality of holes relative to the surface is selected to control an amount of airflow that enters the plurality of holes relative to another amount of airflow that propagates along the surface.

16. The turbine engine according to claim 14, wherein the two successive louvers in the plurality of louvers are configured such that the first distance L1 between the bottoms of the two successive louvers in the plurality of louvers and the second distance L2 between the tops of the two successive louvers in the plurality of louvers are such that a ratio between L1 and L2 between 0.1 and 1.0 provides a maximum cooling effectiveness of airflow on the plurality of inner planks.

17. The turbine engine according to claim 14, wherein the plurality of louvers are configured such that an angle $\theta 2$ of the plurality of louvers relative to the surface of each of the plurality of inner planks is less than or equal to an angle $\theta 1$ of the holes in each of the plurality of inner planks relative the surface, such that a ratio between $\theta 1$ and $\theta 2$ between 1 and 4.5 provides a maximum cooling effectiveness of airflow on the plurality of inner planks.

18. The turbine engine according to claim 14, wherein the plurality of louvers are configured such that a spacing S between the bottoms of the two successive louvers and the surface of each of the plurality of inner planks, and a thickness T of the plurality of inner planks are such that a ratio between S and T between 0.1 and 2 provides a maximum cooling effectiveness of airflow on the plurality of inner planks.

* * * * *